(12) United States Patent
Gibson et al.

(10) Patent No.: US 6,763,031 B1
(45) Date of Patent: Jul. 13, 2004

(54) NETWORK DEVICE INCORPORATING SELECTIVE COMPRESSION OF STORED DATA PACKETS

(75) Inventors: Patrick Gibson, London (GB); Kam Choi, Tring (GB); Christopher Hay, South Harrow (GB); Gareth E Allwright, St. Albans (GB)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/442,238

(22) Filed: Nov. 17, 1999

(30) Foreign Application Priority Data

Oct. 5, 1999 (GB) .............................................. 9923369

(51) Int. Cl.[7] .............................................. H04L 12/54
(52) U.S. Cl. ...................... 370/428; 370/412; 709/247; 711/171
(58) Field of Search ............................... 370/389, 400, 370/401, 412, 413, 428, 429, 477, 521, 474; 711/101, 147, 170, 171, 172; 382/232, 233; 709/246, 247

(56) References Cited

U.S. PATENT DOCUMENTS

| | | | | |
|---|---|---|---|---|
| 5,774,467 A | * | 6/1998 | Herrera Van Der Nood et al. | 370/428 |
| 5,805,932 A | * | 9/1998 | Kawashima et al. | 710/68 |
| 5,949,785 A | * | 9/1999 | Beasley | 370/398 |
| 6,008,743 A | * | 12/1999 | Jaquette | 341/51 |
| 6,060,300 A | * | 5/2000 | Raditsch et al. | 435/214 |
| 6,173,381 B1 | * | 1/2001 | Dye | 711/170 |
| 6,229,823 B1 | * | 5/2001 | Scarmalis | 370/477 |

FOREIGN PATENT DOCUMENTS

| | | |
|---|---|---|
| EP | 0643517 A2 | 9/1994 |
| GB | 2270821 A | 3/1994 |

* cited by examiner

*Primary Examiner*—Douglas Olms
*Assistant Examiner*—Bob A. Phunkulh
(74) *Attorney, Agent, or Firm*—Nixon & Vanderhye P.C.

(57) ABSTRACT

A network device incorporating selective compression of stored data packets is disclosed. The network device receives, stores and forwards data packets and includes a system for applying a compression algorithm to packets after their header portions and storing the partially compressed packets, which are decompressed after readout from storage and before they are forwarded. Lengths of a packet as received and as subject to the compression algorithm are compared to prevent storage when the algorithm fails to produce a shorter packet.

12 Claims, 3 Drawing Sheets

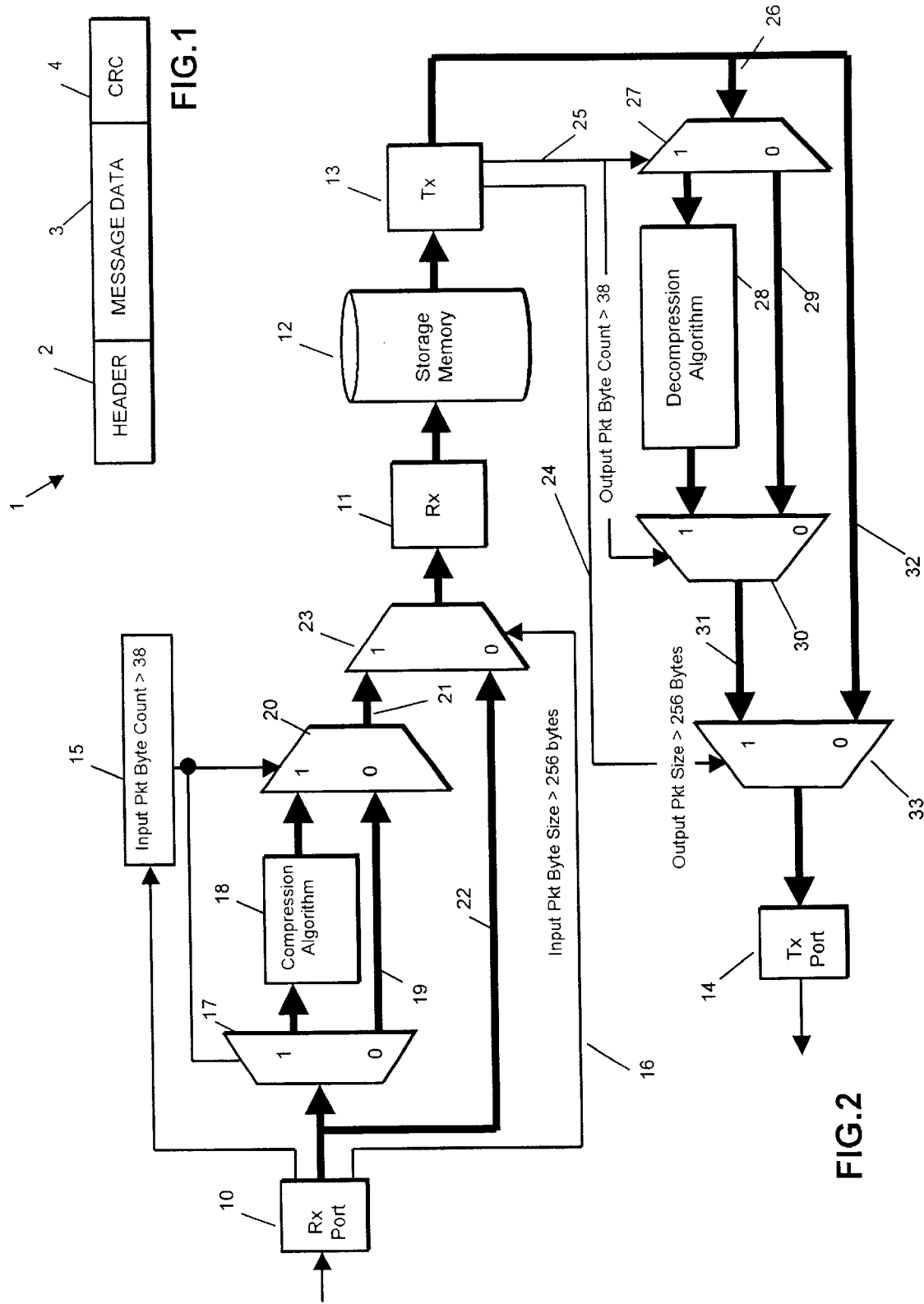

NETWORK DEVICE INCORPORATING SELECTIVE COMPRESSION OF STORED DATA PACKETS

FIELD OF THE INVENTION

This invention relates to network devices which receive and transmit data packets in a packet-based data communication network, particularly though not necessarily exclusively Ethernet networks. The invention is intended to be applicable to network switches and other devices commonly known as bridges and routers and other devices which have at least one, and normally more than one, receive port, at least one and normally more than one transmit port and storage space, typically but not necessarily dynamic random access memory, for the storage of data packets after they are received by the network device and before they are forwarded from it.

BACKGROUND OF THE INVENTION

Network devices of the general nature to which the invention relates commonly include substantial memory space for the storage of data packets. Network devices may have a common memory space into which all packets passing through the device are stored or may be organised, alternatively or additionally, with respective memory space for each receive port and each transmit port. In this respect the terms 'receive port' and 'transmit port' are intended to include the receive and transmit functions of ports which are capable of bidirectional or duplex working.

In general, a compromise must be made between a small memory size, whether for the common memory space or memory space dedicated to any particular receive or transmit port, and over large memory size. The former produces a greater liability for congestion whereas the latter adds to the complexity and cost of the device. The latter is particularly relevant owing to a trend to include greater memory space within ASICS (application-specific-integrated circuits).

The main object of the present invention is to reduce dynamically the memory required for at least some packets and preferably packets generally. Reduction of the memory required for a given input packet size offers many advantages. For example, internal data buses within network devices can be made smaller for the same internal bandwidth performance. For an oversubscribed system, congestion will be held off longer (albeit not necessarily prevented) because more data can be stored before the memory capacity is filled

SUMMARY OF THE INVENTION

Most of the packet data which is processed by a switch or other network device is useless to the device itself Broadly, the data packets (which are defined in the relevant transmission standards) consist of a header in a particular format, message data and cyclic redundancy code data. Only the header information is used for switching or routing decisions. The remainder of the data is merely stored in the memory space within the device until it is either forwarded from a transmit port or discarded.

The present invention is based on compressing packets in respect of their data content after their headers, so as to reduce the storage space required and decompressing the compressed portions of the packets before they are forwarded from the network device. It is desirable for the device to include a means of distinguishing, for example by counting bytes, between the header portion and the subsequent portion of a packet and to select between compressed and uncompressed versions of the packet. It should be understood that 'compressed' herein refers to the application of a compression process or algorithm. It will be understood also that such a process or algorithm does not necessarily result, particularly in respect of small packets, in a reduction in size, though statistically it should do so. Consequently, it is preferred to include some further means which prevents, or at least lessens the probability, of an increase in the size of the packet as a result of the application of a compression algorithm. Such means may be used effectively to select an 'uncompressed' version of the packet in preference to a 'compressed version'.

Further objects and features will be apparent from the detailed description which follows.

BRIEF DESCRIPTION OF THE DRAWINGS

FIG. 1 illustrates in simplified form a typical data packet employed in the present invention.

FIG. 2 is a schematic illustration of one embodiment of a network device according to the invention.

DETAILED DESCRIPTION

Figure 3:
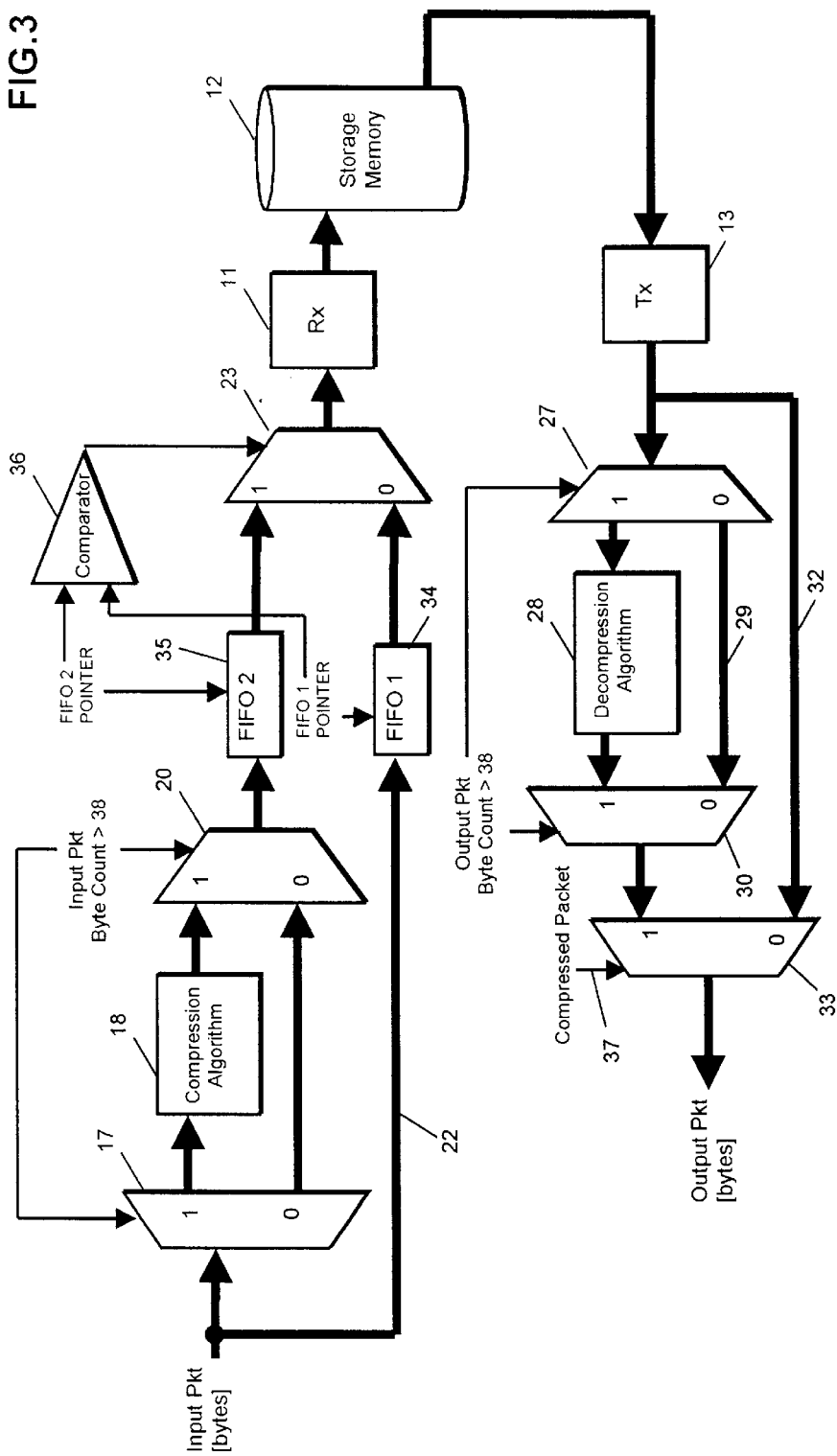
FIG. 3 is a schematic illustration of a preferred embodiment of a network device according to the invention.

The packet 1 illustrated schematically in FIG. 1 comprises, as is well known, a header 2, message data 3 and cyclic redundancy code data 4. Packets are by convention transmitted according to established transmission standards and accordingly in any given system the transition between the header and the message data is known in advance. The header typically comprises a start of frame, address and protocol data and other type or control data which is necessary or desirable for the processing of the packet within the switch or network device. Typically for example the address data is used for bridging or routing and other data such as protocol data may be used for sorting packets into different queues within the memory space. It is presumed in the following description that the division between the header and the message data occurs after the 38$^{th}$ byte in the packet so that a count of bytes provides a reliable indication of the end of the header and the start of the message data.

FIG. 2 illustrates the relevant parts of a switch or other network device which incorporates the present invention. Various parts of the switch are in known form and will be described only in general terms. These known parts of the switch comprise a receive port 10, a receive interface 11, storage memory 12, a transmit interface 13 and a transmit port 14. Very typically there is more than one receive port and more than one transmit port The receive interface 11 and the transmit interface 13 may be partly included in the ports 10 and 14 respectively but serve basically to perform well known functions of a switch. In particular, the receive interface may include the establishment and use of a forwarding database, which requires an address as a key in order to determine from a look-up table the port number or MAC address of the device to which the packet should be forwarded. The receive interface will also include means for forwarding the packet across the switch, particularly to the storage memory 12. Conversely, the transmit interface 13 will achieve readout of the packets from the storage memory and will direct the packets to the identified ports. All this is well known to those skilled in the art and does not require further description. One form of switch which is suitable for the incorporation of the present invention and is commercially available is the 3Com 1100 switch.

The switch shown in FIG. 2 and the switch shown in FIG. 3 are both organised so that a received packet is, subject to different controls which will be described, partially subjected to a compression algorithm which, statistically at least, will compress the size of the packet. The techniques implemented by the switches shown in these Figures have in common the application of a compression algorithm only to that portion of a packet occurring after the header, which in both Figures is presumed (since the format of input packets will be known) to end at the $38^{th}$ byte. The techniques implemented by the switches differ in the criterion employed for storing an uncompressed packet in preference to a packet to which a compression algorithm has been applied.

It is possible to apply a compression algorithm to the non-header portions of all packets and to store such packets indiscriminately. However, as will be indicated later, typical compression algorithms may, especially for small packets, but generally, in dependence on the information content of a packet, actually increase the size of the packet. Such an increase will occur, at least with appropriate selection of compression algorithms, in a minority and normally a small minority of packets, but even so the basic compression and decompression method described herein is preferably modified so that the possibility of the storage of a packet which has been subjected to a compression algorithm but has actually increased in size is either significantly reduced or eliminated.

In FIGS. 2 and 3, thicker lines denote the paths for packet data (and may be constituted by groups of parallel data lines) whereas the narrower lines indicate paths of control data. Parts which perform corresponding functions in the two Figures are denoted by the same reference numerals.

In the switch shown in FIG. 2, the receive port 10 produces in response to a receive packet a count of bytes as they are received as well as an indication of the total size of the packets. These are commonplace operations in receive ports. The count of bytes in the input packet is illustrated separately from the port for convenience by way of the byte counter 15, which produces a control signal, used as described later, immediately the last byte in the header of the packet has been counted. Thus the control signal denotes the transition between the portion of the packet, namely the header, which is not to be compressed and the subsequent portion, which is to be compressed.

The indication of the packet size on the line denoted 16 can readily be obtained by the parsing of the packet, in accordance with well established techniques provided that, as is known, the packet headers include a field which denotes the total size of the packet.

A packet received by port 10 proceeds to the input of a selector or demultiplexer 17 which is responsive to the control signal from the packet counter 15 to direct the packet data through a compressor 18, denoted 'compression algorithm' when the $38^{th}$ byte has been counted but otherwise and in particular before the $38^{th}$ byte along data path 19. Similarly a selector or multiplexer 20 receives inputs from the compressor and the data path 19 and is under the control of the byte count. The selector will pass the data on line 19 to an output data path 21 before the end of the $38^{th}$ byte and will pass the data output from the compressor 18 to the data output 21 after the occurrence of the $38^{th}$ byte. The purpose of this arrangement is to ensure that the version of the packet appearing on data path 21 is not subject to the compression algorithm in respect of the first or header portion but has been subjected to the compression algorithm in respect of the subsequent portion particularly the message data.

Other arrangements for this purpose can be adopted. For example, the so called compressor 18 can be organised so that it does not perform any compression algorithm on an input data signal until enabled, for example by the control signal from the byte counter 15.

As indicated earlier, this embodiment is arranged so that the packets that are stored are subjected to the compression algorithm only if they are above an arbitrarily chosen size. This criterion is employed in the expectation that a substantial number of compression algorithms will not produce any significant compression of the actual size of the packet for packet sizes below an arbitrary limit and are more likely to result in an actual increase in packet size if the packet is smaller than that limit. In the present case, the limit is selected to be 256 bytes though obviously that limit could be altered according to circumstances.

To implement this criterion, an input packet is directed not only to the input of the demultiplexer 17 but is also directed on data path 22 to one input of a multiplexer 23 of which the other input receives the processed data packet, that is to say the packet having the uncompressed header portion and a subsequent portion to which the compression algorithm has been applied. It will be apparent that as far as the header portion of the versions of the packet appearing on data paths 21 and 22 are concerned, they are identical and that the indication of byte size obtained from the header of the packet will be available before the termination of the header portion, that is to say before the end of the $38^{th}$ byte. The multiplexer 23 will select the lower input (data path 22) unless or until the indication of byte size is received and then, if the byte size is greater than 256 bytes will select the upper input (the partially compressed data byte). Provided that the propagation delays for packet header traversing data paths 19 and 22 are equal or can be made equal, the change in selection made by the selector will occur late in the header portion so that there is no loss of data from the header portion. By means of some simple logic, the application of the control on line 16 can be delayed until the end of the $38^{th}$ byte, employing the control signal from byte counter 15, so that the changeover from the uncompressed version of the packet on data path 22 and the version available on data path 21 can be made at the end of the $38^{th}$ byte, namely at the transition between the header portion 2 and the subsequent portion 3 of the packet.

FIG. 2 also shows the decompression process, which is the converse of the process for applying the compression algorithm. Once again in the converse manner, the header portion of a packet obtained from the memory 12 by the interface 13 will not be subject to a decompression algorithm. Also, the version of the packet as stored will be made available unprocessed, i.e. that is to say not subject to any partial decompression if the packet size is less than 256 bytes. The transmit interface will have recourse to the original header portion to provide a control signal on line 24 in the event that the input (and output) packet size is greater than 256 bytes. Furthermore, the transmit interface 13 will provide on line 25 a control signal denoting the end of the $38^{th}$ byte.

The transmit side includes a demultiplexer 27 which function is similar to that of the demultiplexer 17, a decompressor 28 which applies a decompression algorithm to the packet data, a data path 29 in parallel with the decompressor 18, a selector or multiplexer 30 which generally corresponds to the selector 20 and a further selector 33 which corresponds to the selector or multiplexer 23 in the receive side.

Accordingly, during the header portion of the output packet, demultiplexer 27 directs the header portion on data path 29 to the lower input of the multiplexer 30 and thence out on line 31 to the multiplexer 33. At the end of the 38$^{th}$ byte, multiplexer directs the subsequent portion of the output packet through the 'decompressor' 28, this portion of the packet after being subject to the decompression algorithm being selected by multiplexer 13 and being fed out on data path 31 to the upper input of multiplexer 33. In this way the header portion of a packet is not subject to the decompression algorithm whereas the remainder of the packet is so subject to the decompression algorithm. Furthermore, multiplexer 33 selects the non-decompressed version of the packet available on data path 32 unless the indication that the packet size is greater than 256 bytes is received, whereupon the version of the packet available on data path 31 is selected. The changeover may be delayed until the end of the header portion.

The embodiment described with reference to FIG. 2 employs an arbitrary size criterion so that only packets greater than a predetermined size will be both subject to the compression algorithm and stored and likewise only packets of that size will subject to the decompression algorithim and forwarded from the transmit port 14. Moreover, the embodiment requires proper equalization of the delays in the parallel data paths from which different versions of the packet need to be selected. It further requires the packet to include an indication of a packet size in its header and is not applicable if such an indication is not available. FIG. 3 illustrates a preferable arrangement, in which there is an objective criterion for selecting between a 'compressed' version and an 'uncompressed' version of a packet. The embodiment also ameliorates the need for synchronism in various parallel data paths.

In the embodiment shown in FIG. 3, those parts which have the same reference numerals as the parts in FIG. 1 operate in the same way. Therefore, the demultiplexer 17, the 'compressor' 18 and the multiplexer 20 are under the control of the input byte count so that at the output of the multiplexer 20 there is a version of the input packet wherein the header portion has not been subjected to the compression algorithm whereas the remainder of the packet has been subject to the compression algorithm. The data path 22 likewise extends from the receive port (not explicitly shown in FIG. 3) and conveys an uncompressed version of the packet.

In the embodiment shown in FIG. 3, the version of the packet available on data path 22 is put into a first in first out memory 34, whereas the version available at the output of the multiplexer 20 (and which has been partially subjected to the compression algorithm) is put into a second first in first out memory 35. The outputs of the memories are coupled to respective inputs of the selector or multiplexer 23 which is coupled to the receive interface 11. Pointers which indicate the length of the packet in the respective FIFOs are compared by a comparator 36 which controls selector or multiplexer 23 to select whichever version of the packet has the shorter length in the FIFOs 34 and 35.

On the output side, the demultiplexer 27, the 'decompressor' 28, the data path 29 and the selector or multiplexer 30 operate similarly to the corresponding elements described with reference to FIG. 2. The packet read out from memory 12 and provided by the transmit interface 13 is, as described earlier, provided on data path 32 to the lower input of selector or multiplexer 33 as before. This selector is operated by control 37 to select either the packet version available from multiplexer 30 or the 'uncompressed' version from data path 32 according to whether the packet has been compressed or not. This control is obtainable from the comparator 36, which controls whether the 'compressed' or 'uncompressed' version of the packet is stored by way of interface 11 in storage memory 12.

The embodiment shown in FIG. 3 is generally superior to that shown in FIG. 2 because it does not require the matching of delays in the various data paths. Furthermore, instead of the arbitrary criterion, based on packet size, for choosing between compressed and uncompressed versions of the packets the embodiment shown in FIG. 3 uses an objective criterion so that if for any reason the packet which has not been subject to the compression algorithm is greater in size than the uncompressed version, the latter will be selected for storage and for ultimately forwarding from the switch.

Consideration must now be given to the compression algorithms that would be suitable for the present invention. It is feasible, though not preferred, to employ a compression algorithm which involves temporary storage, in for example a FIFO, of an entire data packet and to process the packet or at least the non-header portion thereof before it is fed to the receive interface. However, such a process requires additional storage and introduces a latency which normally would be unacceptable.

One possibility is to employ a Lempel-Ziv compression algorithm and its converse, a Lempel-Ziv decompression algorithm in the compressor 18 and decompressor 28 respectively.

Figure 4:
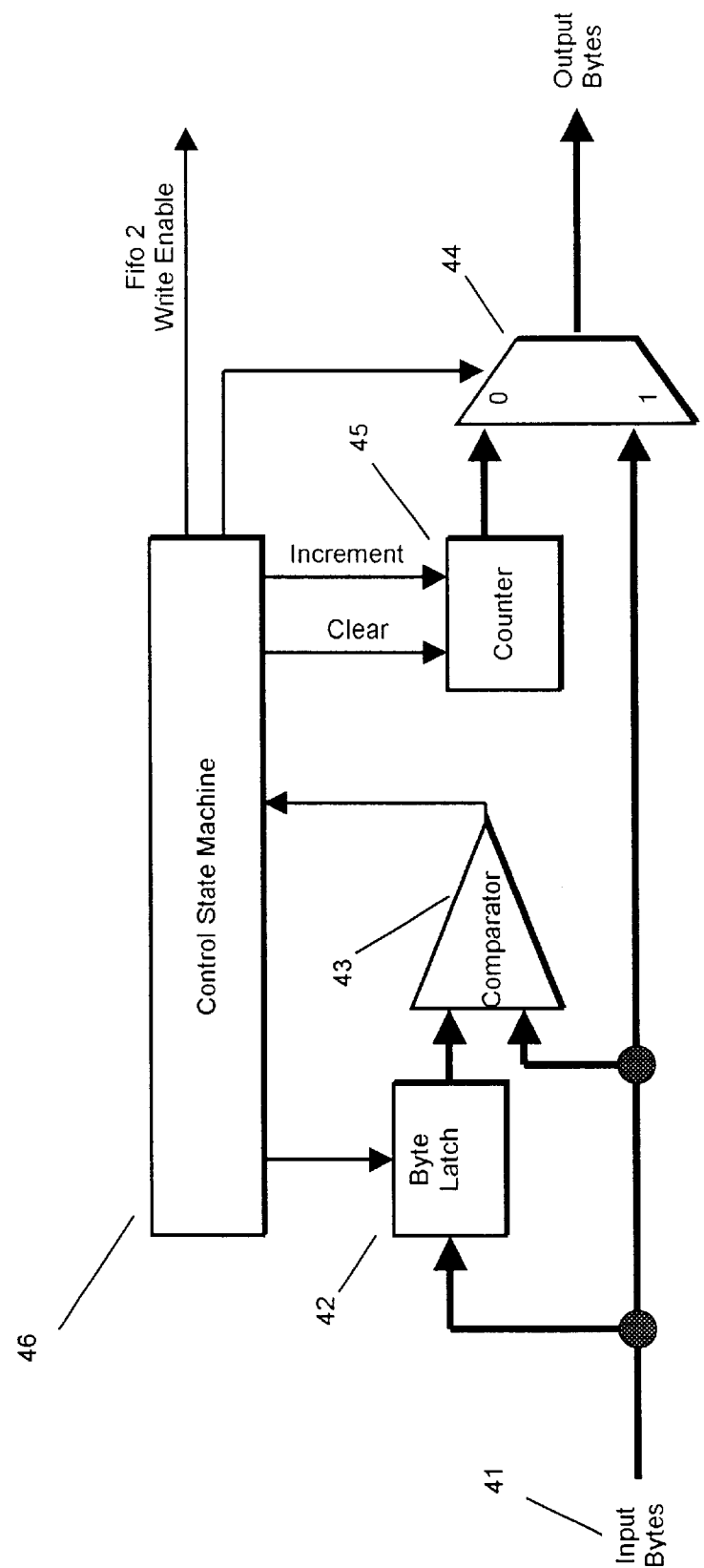
FIG. 4 is a diagram illustrating a compressor.

A practical compressor is shown in FIG. 4. This embodiment is based on a simple run-length compression scheme and compresses the number of repetitive bytes occurring in packets data, using a special 'repeated double sequence' to indicate where repetitions occur and by how many times Input data bytes 41 received at the port 10 are latched into a holding register 42. The holding register stores the most recently received byte of the packet. On receiving the next byte of the packet, the stored and most recently received bytes are compared using a comparator 43 which indicates whether the bytes are identical or not. If the bytes are identical, a counter 45 is incremented by a control state machine 46. The control state machine block 46 also controls writing the data bytes into the storage FIFO and would only allow two identical bytes of a repetitive sequence to be written into the FIFO. After that the number of repetitive bytes would be counted until the end of the repetitive sequence. At this point the control state machine 46 would select the resultant output of the counter 45 for writing into FIFO, selected by multiplexer 44. At this point the control state machine 46 would also reset the counter 45 to zero and a wait detection of the next repetitive sequence. For normal operation and when non-repetitive byte sequences are being received, the multiplexer 44 would be selecting the received data bytes to be written into FIFO. Thus, a sequence of repetitive bytes, e.g. 00 00 00 00, would be represented as the byte written twice, (e.g. 00 00) followed by a byte which represents the number of times it was repeated in the sequence, i.e. 04. A special case is where there is a repetition of only two bytes, which would be represented as 00 00 02. This is where the compression algorithm leads to expansion of the packet size, with an increase in size of one byte for every 'double sequence'. Also since this algorithm uses only a single byte to indicate the number of repetitions, this sequence would have to be repeated if there were more than 256 repetitions of the same character. So for example the hex sequence of bytes:

a1 bb bb cc 00 00 00 00 00 00 00 00 00 00 00 00 00 00 bb bb bb 55 55 55 55 44 05 06 would be compressed to:

a1 bb bb 02 cc 00 00 0f bb bb 03 55 55 04 44 05 06

Such a method of compression has been tested on typical data types occurring in network environments and found to yield compression ratios of between 10 and 40%. Application to JPEG and GIF files (compressed picture formats) gave compression savings of around 10% A small numbers achieved up to 70%. However there were files that expanded in size and these would be the types that would need to be filtered out, using the parallel FIFO scheme. Obviously the compression achievable will vary with different data types.

Decompression of packets compressed as described with reference to FIG. 4 may be performed by reading the packet into a FIFO. The recognition of a repeated byte and the examination of the next following run-length indicating byte will generate the required number of repetitions of a byte, the FIFO being a means of delaying the subsequent bytes until the run of repetitive bytes has been generated.

The compressor shown in FIG. 4 can easily be organised so that the state machine disables the compression process and controls multiplexer 44 to select the uncompressed packet until, for example, the $38^{th}$ byte. Thus the demultiplexer 17 and multiplexer 20 may be omitted, as may the demultiplexer 27 and multiplexer 30 for similar reasons.

What is claimed is:

1. A network device for use in packet-bases data communication system, comprising:

means for receiving data packets;

a memory for storing received data packets;

means for partially compressing at least some received data packets before they are stored in said memory;

means for providing in response to a received packet a version which has not been subject to any compression algorithm and a version which has been subjected to a compression algorithm; and means for selecting between said versions according to predetermined criterion.

2. A network device according to claim 1 wherein said packets each have a header portion and a subsequent portion and said means for partially compressing includes means for providing for storage packets of which the said subsequent portion has been subjected to a compression algorithm.

3. A network device according to claim 1 wherein said criterion is such that the version which has not been subjected to the compression algorithm is selected if the received packet is less than a predetermined size.

4. A network device according to claim 1 wherein said criterion is the size of said versions, the smaller thereof being selected.

5. A network device according to claim 1, further comprising first-in and first-out buffers for each of said versions, said means for selecting being coupled to said buffers and operative to select the smaller version for storage in said memory.

6. A network device according to claim 1 further comprising means for decompressing the partially compressed packets after they are read out from said memory.

7. A network device for use in a packet-based data communication system, comprising:

means for receiving data packets each having a header portion and a subsequent portion;

a memory for storing received data packets;

means for subjecting said subsequent portion of each of a plurality of received packets to a compression algorithm before said packets are stored in said memory;

means for reading out packets from the memory;

means for subjecting to a decompression algorithm the said subsequent portions of packets read out from said memory;

means for providing in response to a received packet a version which has not been subject to any compression algorithm and a version which has been subjected to a compression algorithm; and means for selecting for storage in said memory between said versions according to a predetermined criterion.

8. A network device for use in a packet-based data communication system, comprising means for receiving data packets each comprising a header portion and a message portion, means for applying a compression algorithm to said message portion of a data packet to produce a first version of said packet, means for providing a second uncompressed version of said data packet;

means for selecting, between said first and second versions of the data packet according to a predetermined criterion, and a store for storing whichever version of the data packet is selected by the means for selecting.

9. A network device as in claim 8 wherein the said criterion is a predetermined size of said data packet whereby said second uncompressed version is selected of a packet which is less than said predetermined size.

10. A network device as in claim 8 wherein said criterion is whichever of the first and second versions is shorter.

11. A network device as in claim 8 and further comprising first-in first-out stores for storing said first and second versions of said data packet.

12. A method for operating a packet-based data communication system, comprising:

receiving data packets;

storing received data packets;

partially compressing at least some received data packets before they are stored;

providing in response to a received packet a version which has not been subject to any compression algorithm and a version which has been subjected to a compression algorithm; and selecting between said versions according to a predetermined criterion.

* * * * *